United States Patent Office 2,728,775
Patented Dec. 27, 1955

2,728,775 n-CETYL-3 HYDROXYPYRIDINIUM CHLORIDE

Niels K. F. W. Clauson-Kaas, Hjortekaer pr., Denmark, assignor to A/S Sadolin & Holmblad, Copenhagen, Denmark No Drawing. Application January 11, 1954,
Serial No. 403,464

2 Claims. (Cl. 260—297)

The present invention relates to new compounds which exhibit effective fungicidal and bactericidal properties particularly with regard to antiseptic action when applied to various materials, for instance hands, utensils, floors, walls, etc. These new compounds are the higher alkyl inorganic quaternary ammonium salts of 3-pyridols which are soluble in water to an extent sufficient to impart effective fungicidal or bactericidal properties to the solution.

The fungicidal and bactericidal action of various quaternary ammonium salts of pyridine is known. However, these products often have undesirable odors and are expensive to produce in that they must be synthesized in closed reaction vessels and derived from the relatively expensive pyridine. I have found that the compounds of the present invention exhibit fungicidal and bactericidal action while at the same time they do not have offensive or sharp odors and can be prepared in economical open reaction systems.

The present higher alkyl quaternary ammonium salts of 3-pyridols can be prepared from the conventional reaction of a pyridine with an ester of a higher alkanol with an inorganic acid. However, in the reaction the 3-pyridols must be employed instead of the pyridines. The 3-pyridols used as a starting material can be substituted in any of the 2, 4, 5 and 6 positions by organic substituents such as alkyl, cycloalkyl, aryl, and aralkyl radicals. The reactant supplying the higher alkyl radical to the quaternary ammonium salt can be esters of any of the strong inorganic acids such as hydrobromic, hydrochloric or sulfuric acid, which produce salts soluble in water to the extent indicated. The alkyl portion of this reactant can be straight-chain, branched-chain, and can be further substituted by substituents such as halogens, hydroxy, alkoxy and amino groups or be interrupted by ether-like bound oxygen, sulfur and amino groups. In referring to the higher alkyl groups, I mean those containing 8 to 18 carbon atoms. Suitable alkyl radicals which can form a part of my salts are octyl, decyl, lauryl, myristyl, cetyl, and stearyl. However, I prefer those salts containing the cetyl radical.

These compounds can be prepared from the appropriate 3-pyridol and alkanol ester. For example, 1.30 g. of n-cetyl chloride and 0.47 g. of 3-pyridol were heated in an open vessel for 30 minutes. The mixture first separated into two layers and then after about 10 minutes became homogeneous (almost black clear liquid). Upon cooling a gray cake of crystals was formed. Crystallization from acetone gave 1.21 g. of n-cetyl-(3-hydroxypyridinium)-chloride, an almost white powder having M. P. of 92–93° C. The corresponding salts containing other higher alkyl radicals and other inorganic anions can be prepared by employing under essentially the same reaction conditions 3-pyridol and the corresponding alkanol ester, e. g. lauryl chloride to produce lauryl-(3-hydroxypyridinium)-chloride.

I claim:
1. The higher alkyl quaternary ammonium salts of 3-pyridol.
2. n-Cetyl-(3-hydroxypyridinium)-chloride.

References Cited in the file of this patent

FOREIGN PATENTS 812,360   France _____ Feb. 1, 1937

OTHER REFERENCES

Harris: JACS 62:3202 (1940).